United States Patent
Mano

(10) Patent No.: US 11,921,040 B2
(45) Date of Patent: Mar. 5, 2024

(54) GAS ABSORBANCE SPECTRUM MEASUREMENT DEVICE FREQUENCY LOCKING METHOD, AND GAS ABSORBANCE SPECTRUM MEASUREMENT METHOD

(71) Applicant: Shimadzu Corporation, Kyoto (JP)

(72) Inventor: Kazune Mano, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 180 days.

(21) Appl. No.: 17/614,899

(22) PCT Filed: Sep. 12, 2019

(86) PCT No.: PCT/JP2019/035842
§ 371 (c)(1),
(2) Date: Nov. 29, 2021

(87) PCT Pub. No.: WO2021/048967
PCT Pub. Date: Mar. 18, 2021

(65) Prior Publication Data
US 2022/0236179 A1    Jul. 28, 2022

(51) Int. Cl.
*G01N 21/39*    (2006.01)

(52) U.S. Cl.
CPC .................. *G01N 21/39* (2013.01)

(58) Field of Classification Search
CPC ..... G01N 21/39; G01N 2021/391; G01J 3/10; G01J 2003/423; G01J 3/42; H01S 3/10
(Continued)

(56) References Cited

U.S. PATENT DOCUMENTS

| 4,923,299 A * | 5/1990 | Anderson ............ G01C 19/727 356/470 |
| 2009/0059234 A1* | 3/2009 | Dreyer ..................... G01J 3/02 356/437 |

FOREIGN PATENT DOCUMENTS

| JP | 2011119541 A | 6/2011 |
| JP | 201532700 A | 2/2015 |
| WO | 2017055606 A1 | 4/2017 |

OTHER PUBLICATIONS

First Office Action dated Jul. 5, 2022, for corresponding Japanese Patent Application No. JP 2021-545044.
(Continued)

*Primary Examiner* — Md M Rahman
(74) *Attorney, Agent, or Firm* — Muir Patent Law, PLLC

(57) ABSTRACT

The gas absorption spectroscopic measurement device according to one embodiment of the present invention is provided with: a laser irradiation unit (1); and optical resonator (2), and a first detection unit (3) for detecting light taken out of the optical resonator (2). The gas absorption spectroscopic measurement device acquires the component concentration of a gas to be measured by CRDS (Cavity Ring-Down Spectroscopy) measurement. The laser irradiation unit (1) is provided with: a laser light source (10); a frequency conversion unit (12) configured to selectively output either laser light having the same frequency as the irradiation light source or laser light having a frequency of the laser light source multiplied by a prescribed number of times; a frequency modulation unit (13, 14) for modulating the frequency of the emitted laser light using a modulation signal, a second detection unit for detecting returning light derived from the irradiation light returning to the optical resonator (2); and a feedback control unit (191, 11) for generating an error signal affected by the difference between the frequency of the laser light emitted to the optical
(Continued)

resonator (2) and the modulation signal based on the detection signal from the second detector (18), thereby controlling the oscillation frequency in the laser light source (10) in accordance with the error signal.

2 Claims, 5 Drawing Sheets

(58) Field of Classification Search
USPC .......................................................... 356/326
See application file for complete search history.

(56) References Cited

OTHER PUBLICATIONS

Giusfredi et al., "Saturated-absorption cavity ring-down spectroscopy", Physical Review Letters, 104, 110801, 2010.
Hashiguchi, "Survey and Research on High-Efficiency Measurement Technology for Trace Moisture in Gas," National Institute of Advanced Industrial Science and Technology, National Institute of AIST Quantitative Standards Report, vol. 9, No. 2, pp. 185-205, Oct. 2015.
Drever et al., "Laser Phase and Frequency Stabilization Eugene and Optical Resonator (Laser Phase and Frequency Stabilization Using an Optical Resonator)", Applied Physics B, 1983, vol. 31, Issue 2, pp. 97-105.
Written Opinion from the International Search Authority dated Mar. 12, 2019, for PCT application No. PCTJP2019035842.
Notice of Allowance dated Dec. 6, 2022 for corresponding Japanese Patent Application No. JP 2021-545044.

\* cited by examiner

GAS ABSORBANCE SPECTRUM MEASUREMENT DEVICE FREQUENCY LOCKING METHOD, AND GAS ABSORBANCE SPECTRUM MEASUREMENT METHOD

TECHNICAL FIELD

The present invention relates to a gas absorption spectroscopic measurement device and a gas absorption spectroscopic measurement method for measuring a component concentration in a gas to be measured using absorbance to laser light.

BACKGROUND OF THE INVENTION

As a method for measuring a concentration of a certain component in a gas to be measured, a laser absorption spectroscopy is widely used. There are several methods for laser absorption spectroscopy. As one method, there is cavity ring-down absorption spectroscopy (Cavity Ring-Down absorption Spectroscopy; hereinafter may be idiomatically referred to as "CRDS"). CRDS is a technique for improving detection sensitivity by increasing the effective optical path length for optical absorption using an optical resonator (see, e.g., Non-Patent Document 1).

FIG. 5 is a schematic configuration diagram of a typical CRDS device. In FIG. 5, laser light having a predetermined wavelength emitted from a laser light source unit 100 passes through an optical switch 101 and is introduced into a cylindrical measurement cell 20 in which a gas to be measured is accommodated. At both ends of the measurement cell 20, mirrors 21 and 22 each having high reflectance (only a small amount of light is transmitted) are arranged in an opposed manner. The measurement cell 20 and the pair of mirrors 21 and 22 constitute an optical resonator 2. This optical resonator 2 is similar to a Fabry-Perot resonator which is commonly used, for example, in a laser device or the like. The wavelength (frequency) of light that can resonate is determined depending on the resonant condition, such as, e.g., the cell length. Note that the optical resonator 2 may be a ring-type resonator composed of three or more mirrors rather than a resonator in which two mirrors are arranged in an opposed manner.

The frequency that can resonate in the optical resonator 2 is generally referred to as a mode frequency. FIG. 6 is a spectrum showing the relation between a mode frequency and a frequency of laser light. As shown in FIG. 6, the mode frequency exists at predetermined frequency intervals. No optical power is stored in the optical resonator 2 when the frequency of laser light introduced into the optical resonator 2 does not match this mode frequency. On the other hand, when the oscillation frequency of the laser light is adjusted to coincide with the mode frequency in the laser light source unit 100, the optical power is accumulated in the optical resonator 2.

In the CRDS device, the laser light incident on the optical resonator 2 is steeply blocked by the optical switch 101 in a state in which the optical power is sufficiently accumulated in the optical resonator 2. Then, the light accumulated in the optical resonator 2 just before the blocking travels back and forth a number of times (actually several thousands to several tens of thousands of times) between the pair of mirrors 21 and 22. During that time, the light is absorbed by the components in the gas to be measured encapsulated in the measurement cell 20 to be gradually attenuated. At that time, the state of the attenuation of a part of the light leaking to the outside through the exit-side mirror 22 of the optical resonator 2 is continuously detected by the photodetector 3. The constant (ring-down time) of the optical attenuation time is determined based on the data detected by the photodetector 3. This makes it possible to calculate the absorption coefficient of the target component in the gas to be measured at the frequency of the laser light at that time. Then, based on the absorption coefficient, the absolute concentration of the target component can be determined. Further, by repeating the measurement of the cavity ring-down (CRD) signal in the same manner as described above while scanning the oscillation frequency of the laser light in the laser light source unit 100 in a specified range, the absorption spectrum due to the target component in the gas to be measured can also be obtained.

In order to acquire the absorption coefficient α of the target component in the gas to be measured, the following Equation (1) is usually used (see, e.g., Patent Document 1).

$$\alpha = (1/c)\{(1/\tau) - (1/\tau 0)\} \quad (1)$$

where c is a speed of light. τ is a ring-down time when the gas to be measured is accommodated in the measurement cell 20. τ0 is a ring-down time when no gas to be measured is accommodated in the measurement cell 20 (e.g., in a vacuum state) or when the absorption by the component in the gas to be measured can be completely negligible. On the other hand, the relation between the absorption coefficient α, the number density n, and the absorption cross-section σ of the target component (absorbing material) is expressed by the following Equation (2).

$$\alpha = n\sigma \quad (2)$$

Thus, using Equations (1) and (2), it is possible to calculate the absolute concentration for the component for which the absorption cross-section is known from the two ring-down times τ and τ0. In the CRDS device, the difference between the two ring-down times τ and τ0 is large because the effective distance (optical path length) along which the light passes through the gas to be measured is extended using the optical resonator 2. As a result, even slight optical absorption due to a trace amount of the target component can be detected, and higher detection sensitivity can be realized as compared with a laser absorption spectroscopy of other methods.

PRIOR ART DOCUMENT

Patent Document

Patent Document 1: Japanese Unexamined Patent Application Publication No. 2011-119541
Patent Document 2: Japanese Unexamined Patent Application Publication No. 2015-32700

Non-Patent Document

Non-Patent Document 1: Koji HASHIGUCHI, "Survey and Research on High-Efficiency Measurement Technology for Trace Moisture in Gas," National Institute of Advanced Industrial Science and Technology, National Institute of AIST Quantitative Standards Report, Vol. 9, No. 2, pp. 185-205, October 2015
Non-Patent Document 2: R. W. P. Drever, and six others, Laser Phase and Frequency Stabilization Eugene and Optical Resonator (Laser Phase and Frequency Stabilization Using an Optical Resonator), Applied Physics B, 1983, Volume 31, Issue 2, pp. 97-105

SUMMARY OF THE INVENTION

Problems to be Solved by the Invention

As described above, in a CRDS device, in principle, it is required to perform the measurement in a state in which the mode frequency of the optical resonator and the oscillation frequency of the laser light coincide with each other. As a method for causing the mode frequency of the optical resonator to coincide with the oscillation frequency of the laser light, a PDH (Pound-Drever-Hall) method, which is disclosed in detail in Non-Patent Document 2, is often used.

In a CRDS device using a PDH method (see, e.g., Patent Document 2), an oscillation frequency of laser light from a laser light source unit is modulated by a phase modulation element and caused to be incident on an optical resonator. Then, the photodetector detects the light reflected back in the optical resonator for the incident light and acquires an error signal by synchronously detecting the detection signal with a modulation signal. This error signal contains information on the difference between the oscillation frequency of the laser light and the mode frequency of the optical resonator. This error signal becomes smaller as the consistency between the oscillation frequency and the mode frequency is enhanced. Therefore, by controlling the oscillation frequency of the laser light in the laser light source unit so that the error signal is minimized, the oscillation frequency is made to coincide with the mode frequency. This feedback control allows the oscillation frequency of the laser light to be locked to the mode frequency of the optical resonator.

In the case of not using a method for locking the frequency by the PDH method or the like, it is necessary to acquire the CRD signal by waiting for the timing at which the oscillation frequency and the mode frequency of the optical resonator coincide with each other while changing, for example, the oscillation frequency of the laser light. As a result, the timing at which the measurement can be performed is quite limited. In contrast, by using the PDH-method, the oscillation frequency of the laser light can be constantly made to coincide with the mode frequency. For this reason, the number of measurements per unit time can be increased, which in turn can greatly improve the measurement efficiency.

However, a CRDS device using the conventional PDH method has the following problems.

In order to perform the feedback control of the oscillation frequency of the laser light by the PDH-method, it is required that the error signal has been acquired at the beginning of the control. In a typical circuit for implementing the PDH-method, the error signal can be acquired only when the difference between the oscillation frequency of the laser light and the mode frequency is small (in general, when the difference is equal to or less than about the longitudinal mode pulse line width on the frequency spectrum). On the other hand, in order to achieve high detection accuracy or sensitivity in the CRDS device, it is required to narrow the longitudinal mode pulse line width (strictly speaking, the oscillation condition is set such that the longitudinal mode pulse line width is narrowed). Then, the frequency region in which the error signal in the PDH-method can be generated becomes also very narrow. For this reason, when the PDH method is applied to the CRDS device, the oscillation frequency of the laser light must be controlled with high accuracy so that the oscillation frequency of the laser light falls within the frequency region of the pulse line width in a very small longitudinal mode.

That is, when the longitudinal mode pulse line width of the optical resonator is narrowed to increase the measurement accuracy or the sensitivity in the CRDS device, it becomes necessary to control the oscillation frequency of the laser light with high accuracy. Therefore, the cost of the laser light source unit and/or the laser control circuitry will increase. Conversely, in order to mitigate the accuracy of controlling the oscillation frequency of the laser light, it is required to extend the longitudinal mode pulse line width of the optical resonator. In this case, there is a dilemma that the measurement accuracy and the sensitivity in the CRDS device deteriorate.

The present invention has been made to solve the above-described problems. The purpose of the present invention is to provide, in a CRDS device using a PDH method, a gas absorption spectroscopic measurement device and a gas absorption spectroscopic measurement method capable of quickly making an oscillation frequency of laser light and a mode frequency of an optical resonator coincide with each other without performing high-precision control of the oscillation frequency of the laser light and performing high-precision and sensitive measurement while maintaining a state in which both the frequencies coincide with each other.

Means for Solving the Problem

A gas absorption spectroscopic measurement device according to one aspect of the present invention is configured to acquire a component concentration of a gas to be measured by cavity ring-down absorption spectroscopy, the gas absorption spectroscopic measurement device comprising:
- a laser irradiation unit;
- an optical resonator configured to cause light emitted from the laser irradiation unit to resonate, the optical resonator including a measurement cell for accommodating the gas to be measured; and
- a first detection unit configured to detect light taken out of the optical resonator, wherein the laser irradiation unit includes:
- a laser light source capable of adjusting an oscillation frequency thereof;
- a frequency conversion unit configured to selectively output either laser light having the same frequency as the laser light source or laser light having a frequency of the frequency of the laser light source multiplied by a predetermined number of times;
- a frequency modulation unit configured to modulate the frequency of the laser light emitted from the frequency conversion unit using a modulation signal;
- a second detection unit configured to detect returning light from the optical resonator derived from the laser light emitted to the optical resonator after being modulated by the frequency modulation unit; and
- a feedback control unit configured to generate an error signal affected by a difference between a frequency of the laser light emitted to the optical resonator and a mode frequency of the optical resonator, based on a detection signal from the second detection unit and the modulation signal, thereby controlling the oscillation frequency of the laser light source in response to the error signal.

A gas absorption spectroscopic measurement device according to another aspect of the present invention is configured to acquire a component concentration of a gas to be measured by cavity ring-down absorption spectroscopy, the gas absorption spectroscopic measurement device comprising:

a laser irradiation unit;

an optical resonator configured to cause light emitted from the laser irradiation unit to resonate, the optical resonator including a measurement cell for accommodating the gas to be measured; and a first detection unit configured to detect light taken out of the optical resonator, wherein the laser irradiation unit includes:

a laser light source capable of adjusting an oscillation frequency thereof;

a splitting unit configured to split the laser light emitted from the laser light source into a plurality of laser light;

a frequency conversion unit configured to output one of the plurality of laser light split by the splitting unit having a frequency of the frequency of the laser light source multiplied by a predetermined number of times;

a first frequency modulation unit configured to modulate a frequency of the laser light emitted from the frequency conversion unit, using a first modulation signal;

a second frequency modulation unit configured to modulate a frequency of the other laser light split at the splitting unit, using a second modulation signal;

a unification unit configured to cause first laser light modulated by the first frequency modulation unit and second laser light modulated by the second frequency modulation unit to be incident on the optical resonator in an optically separable manner; and a second detection unit configured to independently detect returning light from the light resonator derived from the first laser light emitted to the optical resonator and returning light from the light resonator derived from the second laser light emitted to the light resonator; and a feedback control unit, wherein the feedback control unit is configured to:

generate a first error signal reflecting a difference between a frequency of the first laser light and a mode frequency of the optical resonator, based on a detection signal by the second detection unit and the first modulation signal;

perform feedback control of an oscillation frequency in the laser light source in response to the first error signal to thereby adjust the oscillation frequency to the mode frequency of the oscillation resonator; and thereafter maintain a state of the feedback control, or generate a second error signal reflecting a difference between a frequency of the second laser light and the mode frequency of the optical resonator, based on a detection signal by the second detection unit derived from returning light derived from the second laser light and the second modulation signal, and perform feedback control corresponding to the second laser light to continuously perform the control of the oscillation frequency in the laser light source.

One aspect of the present invention is a frequency locking method for locking an oscillation frequency of a laser light source to a resonance frequency of an optical resonator, the frequency locking method comprising:

a first step of converting a frequency of laser light to an integral multiple of the oscillation frequency;

a second step of modulating the laser light in which a frequency has been converted, using a modulation signal;

a third step of causing the modulated laser light to be incident on the optical resonator;

a fourth step of detecting returning light from the optical resonator;

a fifth step of generating an error signal corresponding to a difference between a frequency of the laser light incident on the optical resonator and a mode frequency of the optical resonator, based on detected returning light and the modulation signal; and a sixth step of controlling the oscillation frequency of the laser light source by performing feedback of the error signal.

Further, one aspect of the present invention is a gas absorption spectroscopic measurement method using the frequency locking method, the gas absorption spectroscopic measurement method further comprising:

a seventh step of adjusting the oscillation frequency of the laser light source to the mode frequency of the optical resonator, and thereafter, while maintaining feedback control in the step, performing measurement by cavity ring-down absorption spectroscopy using laser light from the laser light source.

Another aspect of the present invention is a gas absorption spectroscopic measurement method using the frequency locking method, the gas absorption spectroscopic measurement method further comprising:

a seventh step of adjusting the oscillation frequency of the laser light source to the mode frequency of the optical resonator, and thereafter modulating a frequency of the laser light of a fundamental frequency emitted from the laser light source using a modulation signal and emitting it to the optical resonator, and, while performing feedback control based on the returning light, performing measurement by cavity ring-down absorption spectroscopy using laser light of a fundamental frequency from the laser light source.

Effects of the Invention

The feedback control method of the oscillation frequency of the laser light in the gas absorption spectroscopic measurement device, the frequency locking method, and the gas absorption spectroscopic measurement method according to the above-described each aspect of the present invention is based on the above-described PDH method. Note that in this disclosure, the "predetermined number of times" when converting the frequency of the laser light emitted from the laser light source unit is typically a natural number (positive integer) of times other than 1, usually two times.

In the gas absorption spectroscopic measurement device, the frequency locking method, and the gas absorption spectroscopic measurement method according to the above-described aspects of the present invention, the oscillation frequency of the laser light source is adjusted. For example, in a state in which the oscillation frequency of the laser light in the laser light source and the mode frequency of the optical resonator do not match, such as immediately after starting the device, the adjustment is performed as follows. That is, the oscillation frequency of the laser light source is adjusted by the feedback control by the PDH method using the laser light of not the fundamental frequency but a frequency obtained by multiplying the fundamental frequency by a predetermined number of times, for example, two times. The reflectance of the mirror used in the optical resonator depends on the frequency of the light. The reflectance of the mirror indicating a higher reflectance in the fundamental frequency becomes lower than the reflectance at the fundamental frequency at the frequency obtained by multiplying the fundamental frequency by a predetermined number of times. Therefore, the longitudinal mode pulse width of the optical resonator in a frequency obtained by multiplying the fundamental frequency by a predetermined number of times becomes wider than that in the fundamental frequency. For this reason, even if the deviation between the frequency of the laser light and the mode frequency is large to some extent, an appropriate error signal can be obtained, which enables appropriate feedback control so that the frequency of the laser light coincides with the mode frequency.

As described above, according to the gas absorption spectroscopic measurement device, the frequency locking method, and the gas absorption spectroscopic measurement method according to the above-described each aspect of the present invention, without controlling the oscillation frequency of the laser light in the laser light source with high accuracy, it is possible to quickly make the oscillation frequency of the laser light and the mode frequency of the optical resonator coincide with each other and perform the CRDS (Cavity Ring-Down Spectroscopy) measurement in a state in which the coincidence is maintained, with high accuracy and sensitivity.

Consequently, according to the present invention, there is no need to control the oscillation frequency of the laser light with high accuracy. Therefore, the cost of the apparatus can be reduced.

Further, according to the present invention, it is possible to quickly make the oscillation frequency of the laser light and the mode frequency of the optical resonator coincide with each other and maintain the coincidence state. Therefore, it is possible to increase the number of measurements that can be performed per unit time and improve the measurement efficiency.

Further, according to the present invention, it is also possible to control such as to rapidly make the oscillation frequency of laser light coincide with the mode frequency appearing at constant frequency intervals in order. Therefore, the measuring time can also be reduced even when acquiring the CRD signal over a wide frequency range.

Furthermore, according to the present invention, it is possible to adopt an ultra-high reflective mirror extremely high in reflectance, which was conventionally difficult to apply the control of the oscillation frequency of the laser light by a PDH method, as a mirror of an optical resonator. Therefore, it is possible to increase the measurement accuracy and sensitivity of a CRDS than in the prior art.

EMBODIMENTS FOR CARRYING OUT THE INVENTION

First Embodiment

Figure 1:
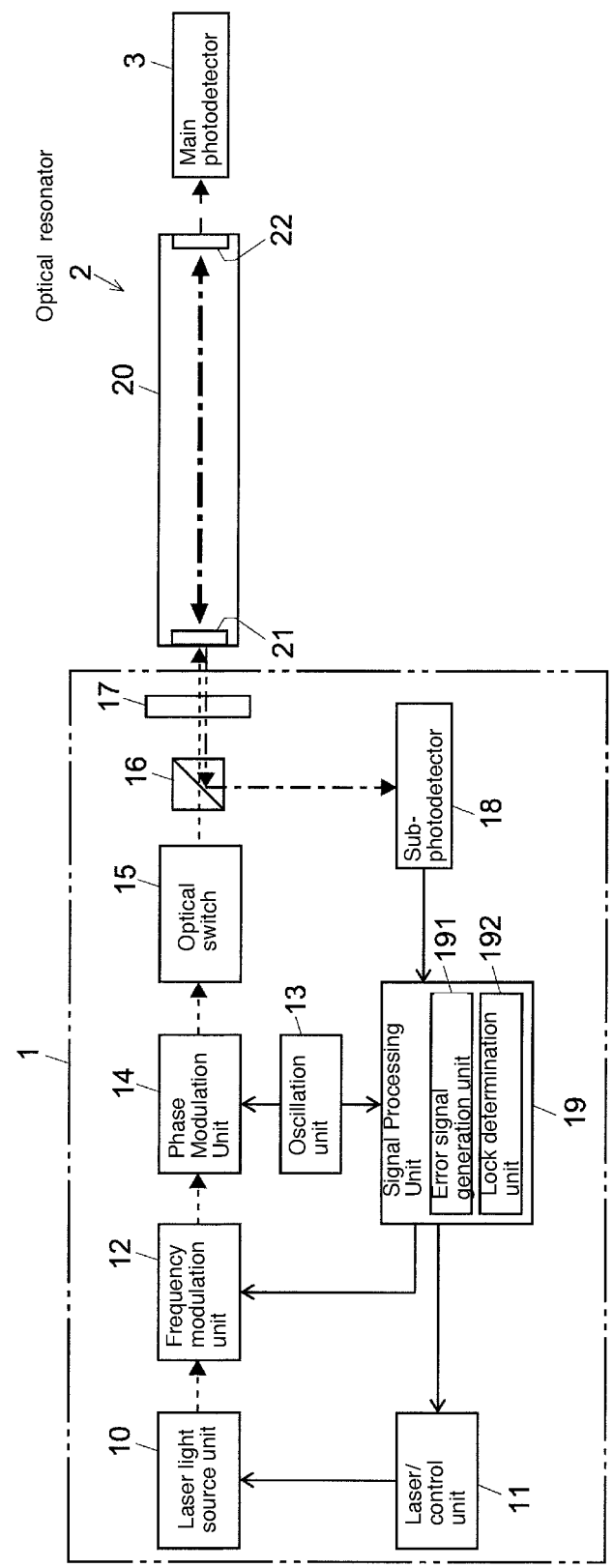
FIG. 1 is a configuration diagram of a main part of a CRDS device according to a first embodiment of the present invention.
Figure 2:
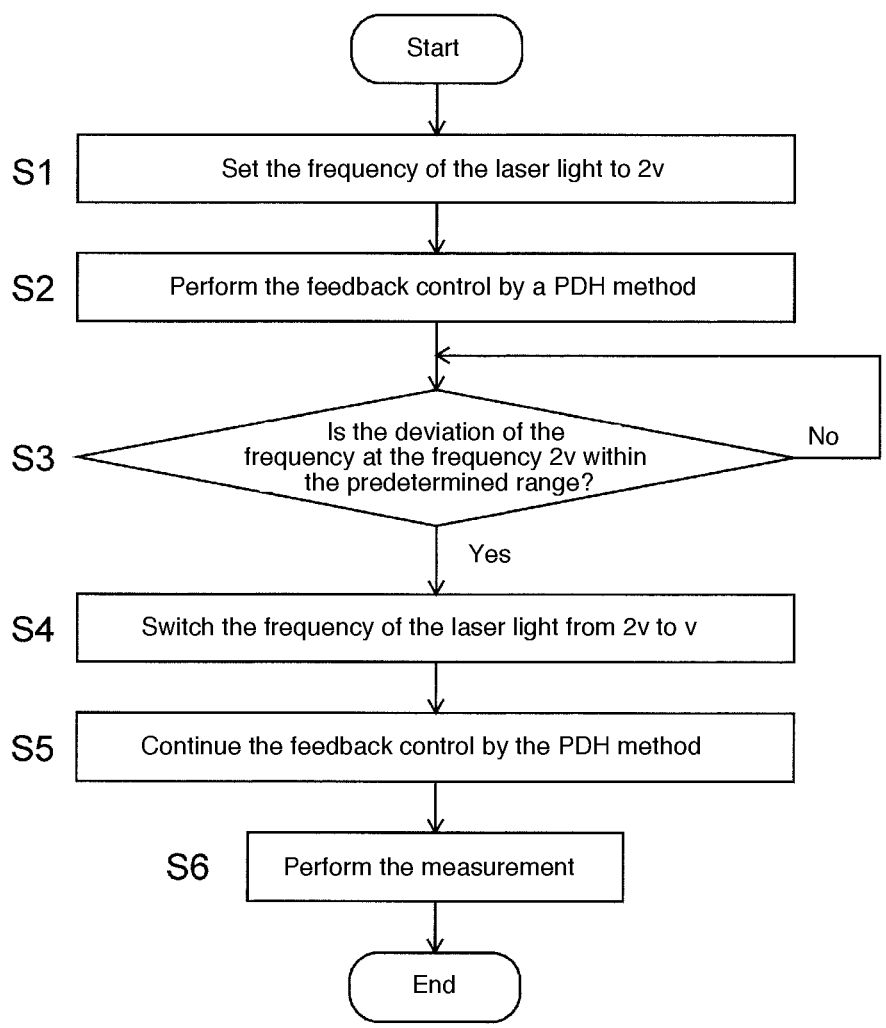
FIG. 2 is a flowchart showing an example of procedures before starting measurements in the CRDS device of the first embodiment.
Figure 3:
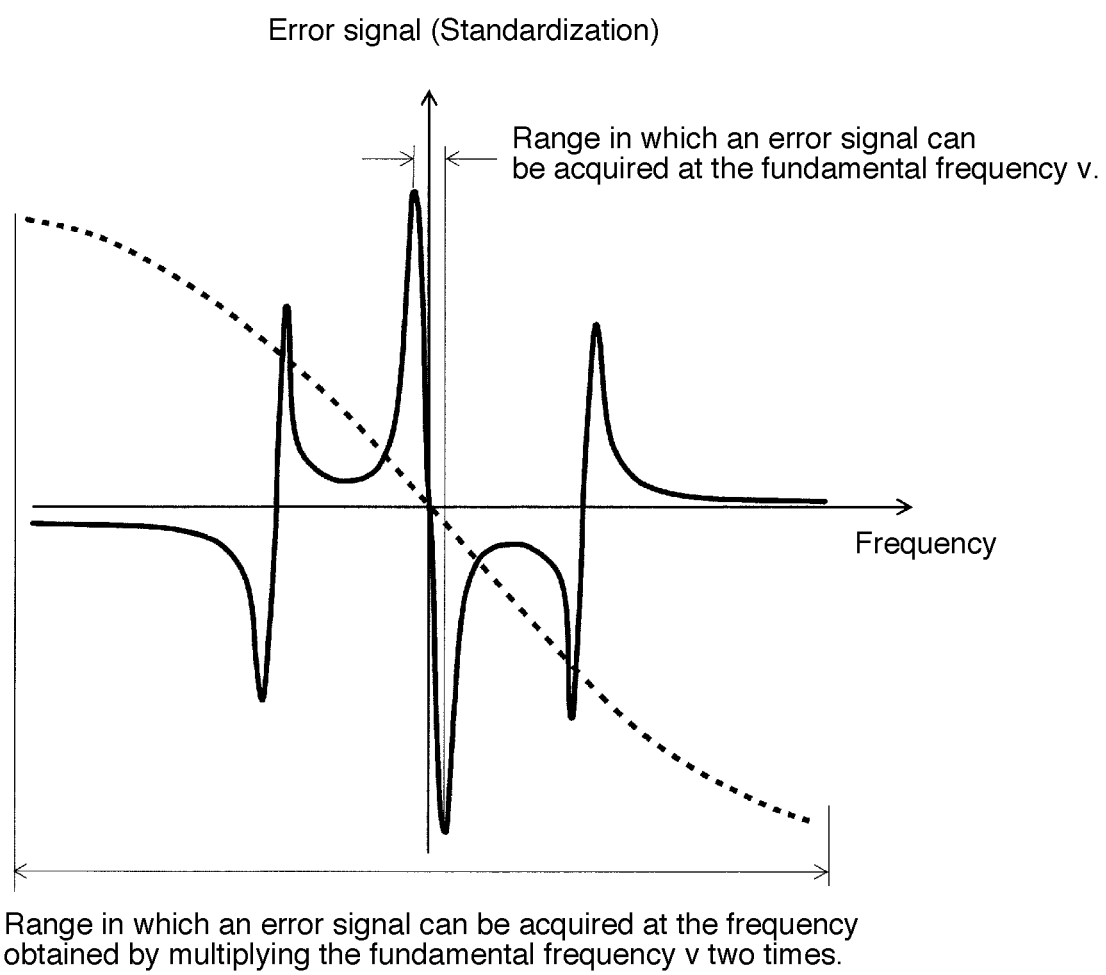
FIG. 3 is a diagram showing the frequency dependency of an error signal obtained during the feedback control of the frequency of the laser light in the CRDS device of the first embodiment.

A first embodiment of a gas absorption spectroscopic measurement device according to the present invention will be described with reference to the attached drawings. FIG. 1 is a configuration diagram of a main part of a CRDS device of the first embodiment. FIG. 2 is a flowchart showing an example of procedures before starting the measurements in the CRDS device of this embodiment. FIG. 3 is a diagram illustrating the frequency dependency of the error signal obtained during the feedback control of the frequency of the laser light in the CRDS device of this embodiment.

As shown in FIG. 1, the CRDS device of this embodiment is provided with a laser irradiation unit 1 including a laser light source unit 10, an optical resonator 2, and a main photodetector 3. The optical resonator 2 and the main photodetector 3 are the same as the components in the conventional common CRDS device shown in FIG. 5 and are denoted by the same reference symbols.

The laser irradiation unit 1 includes, in addition to the laser light source unit 10, a laser control unit 11, a frequency conversion unit 12, an oscillation unit 13, a phase modulation unit 14, an optical switch 15, a polarization beam splitter 16, a quarter-wave plate 17, a sub-photodetector 18, and a signal processing unit 19.

The frequency conversion unit 12 selectively emits the laser light of the fundamental frequency (wavelength) of v generated by the laser light source unit 10 with the fundamental frequency either unchanged or converted into twice the fundamental frequency (2v). The conversion of the frequency of the laser light to be emitted is mechanically or electrically controlled.

Specifically, the frequency conversion unit 12 may be configured as follows. That is, an element capable of high-speed switching of optical paths, such as, e.g., a Galvano mirror, is used. The element switches between an optical path in which light passes through a nonlinear optical crystal or a pseudo-phase matching element and an optical path in which light does not pass through it. Alternatively, light is incident on both the optical paths in parallel, and one of the optical paths is selectively blocked using an acoust optical modulator (AOM) or the like. This switches the frequency of the resulting laser light. As another example, in a case where an element having a very small tolerance of an incident wavelength that can be converted like a pseudo-phase matching element is used, the wavelength conversion efficiency can be greatly changed by the temperature change of the element. Therefore, the fundamental wave and the double wave may be switched thereby.

The phase modulation unit 14 is, for example, an electro-optic modulator (EOM) capable of electrically changing the refractive index of light. The phase modulation unit 14, modulates the frequency and the phase of the laser light incident via the frequency conversion unit 12, based on the modulation signal input from the oscillation unit 13.

Figure 5:
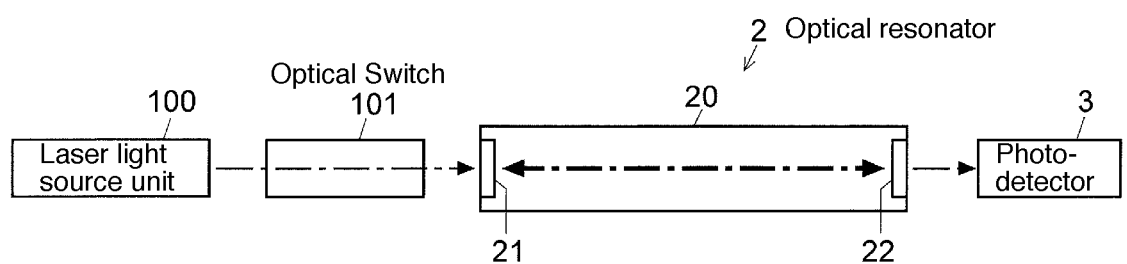
FIG. 5 is a schematic configuration diagram of a typical CRDS device.
Figure 6:
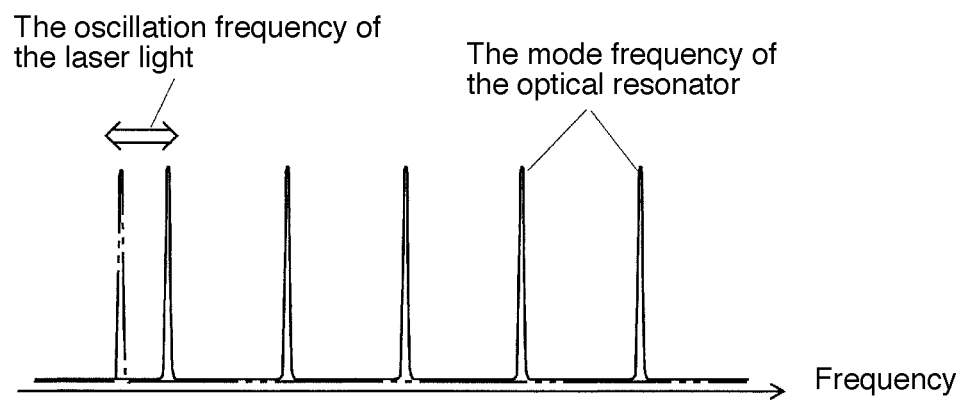
FIG. 6 is a schematic spectral diagram showing the relation between the mode frequency of the optical resonator and the oscillation frequency of the laser light.

The optical switch 15 is the same as the optical switch 101 in FIG. 5. The optical switch 15 is an optical element for shutting off the laser light incident via the phase modulation unit 14 in a short time. The polarization beam splitter 16 selectively transmits one polarized component (e.g., s-polarized light) of the light incident through the optical switch 15. Further, the polarization beam splitter 16 reflects the returning light of the polarized component (e.g., p-polarized light) different from the incident light returned via the quarter-wave plate 17 by the inner reflection surface in a substantially perpendicular direction.

The quarter-wave plate 17 is an optical element that reversibly changes between a linearly polarized state and a circularly polarized state. The quarter-wave plate 17 causes the light arriving from the polarization beam splitter 16 to be incident on the optical resonator 2 by changing the polarized state of the light. Further, the quarter-wave plate 17 returns the polarized state of the light returning from the optical resonator 2 to the polarization beam splitter 16 by changing again. The sub-photodetector 18 is provided at the position capable of detecting the returning light reflected by the polarization beam splitter 16 and outputs an electric signal corresponding to the strength of the returning light. The signal processing unit 19 includes an error signal generation unit 191 and a lock determination unit 192, as functional blocks. The laser control unit 11 adjusts the oscillation frequency of the laser light source unit 10 according to the signal from the signal processing unit 19.

The operation of the CRDS device of this embodiment will now be described.

Here, as an example, the following case is assumed. The round trip resonator length L of the optical resonator 2 is 1 m. The reflectance R of the mirror 21 and 22 with respect to the fundamental frequency of v of the laser light in the case of not performing the transformation of the frequency in the frequency conversion unit 12 is 99.99%. The reflectance R of the mirror 21 and 22 when the laser light of the frequency of 2v obtained by converting the frequency in the frequency conversion unit 12 is incident on the optical resonator 2 is 99%. The longitudinal mode pulse line width in the optical resonator 2 can be expressed by the following Equation (3).

$$vFWHM \approx \{c(1-R)\}/2\pi L\sqrt{R} \tag{3}$$

Equation (3) implies that the reflectance of the mirror 21, 22 has a large effect on the longitudinal mode pulse line width.

According to Equation (3), the longitudinal mode pulse full width at half maximum at the frequency of v becomes about 5 kHz, and the longitudinal mode pulse full width at half maximum at the frequency of 2v becomes about 0.5 MHz(=500 kHz). It is assumed that the frequency range in which an error signal can be obtained properly in a PDH method is about twice the longitudinal mode pulse full width at half maximum. In this instance, the frequency range in which an error signal can be acquired becomes ±5 kHz at the frequency of v and ±0.5 MHz at the frequency of 2v. That is, by doubling the frequency of the laser light introduced in the optical resonator 2, the frequency range in which an error signal can be acquired is expanded by about 100 times. This greatly lightens the accuracy of the frequency of the early laser light.

In FIG. 3, the frequency dependency of the error signal generated by the error signal generation unit 191 when the light of the fundamental frequency of v is used is shown with a solid line. In a case where the oscillation frequency of the laser light is controlled so that the absolute value of the error signal becomes small (approaches zero), an appropriate error signal can be acquired only in a frequency range in which the error signal varies monotonically with respect to the frequency. As shown in FIG. 3, the frequency range in which an appropriate error signal can be obtained for the light of the fundamental frequency of v is very narrow. In contrast, in the error signal for the light of the fundamental frequency of 2v, the frequency range in which an appropriate error signal can be acquired is considerably expanded as indicated by the dotted line. If the frequency of the original laser light is within this frequency range, the frequency of the laser light is adjusted by the PDH method to match the mode frequency. Therefore, in the CRDS device of this embodiment, when performing the CRDS (Cavity Ring-Down Spectroscopy) measurement, the frequency of the laser light is adjusted according to the following steps.

In the initial state in which the fundamental frequency of the laser light does not match the mode frequency of the optical resonator 2, the lock determination unit 192 outputs a signal indicating that it is not in a lock state. Upon receiving this signal, the frequency conversion unit 12 converts the frequency of the laser light incident from the laser light source unit 10 to double the frequency and emits laser light of the frequency of 2v (Step S1).

This laser light is modulated in frequency by the phase modulation unit 14 based on the modulation signal generated by the oscillation unit 13 and is emitted to the optical resonator 2 via the optical switch 15, the polarization beam splitter 16, and the quarter-wave plate 17. A particular polarized component (e.g., s-polarized light), which is in a linearly polarized state, is selected when passing through the polarization beam splitter 16, and the linearly polarized light is converted to circularly polarized light when passing through the quarter-wave plate 17. The laser light emitted to the optical resonator 2 is incident on the measurement cell 20 and is reflected back and forth between the pair of mirrors 21 and 22. A portion of the light returns to the laser irradiation unit 1 via the incident side mirror 21.

This returning light reaches the polarization beam splitter 16 via the quarter-wave plate 17. When the returning light is converted from the circularly polarized light to the linearly polarized light by the quarter-wave plate 17, it becomes a polarized component (e.g., p-polarized light) that differs from the component at the time of the previous incident. Therefore, this returning light is reflected by the inner surface of the polarization beam splitter 16 toward the sub-photodetector 18. The sub-photodetector 18 outputs a detection signal corresponding to the intensity of the incident returning light. The detection signal based on the returning light includes information about the resonance mode of the optical resonator 2. The error signal generation unit 191 generates an error signal including the information on the difference between the mode frequency of the optical resonator 2 and the frequency of 2v of the laser light from this detection signal and the modulation signal obtained from the oscillation unit 13. The error signal (absolute value) becomes small as the difference between the frequency of 2v of the laser light and the mode frequency becomes small. The laser control unit 11 controls the oscillation frequency of the laser light in the laser light source unit 10 so that the error signal reduces. That is, by performing the feedback control by the PDH method, the frequency of 2v of the laser light is made to coincide with the mode frequency in the optical resonator 2 (Step S2).

Note that in a case where the fundamental frequency of v of the laser light and the mode frequency coincide with each other and the laser light is in a state in which it resonates by the optical resonator 2, the laser light of the frequency of 2v which is twice as large as that also resonates by the optical resonator 2. The reason is as follows. The resonant condition of the optical resonator 2 is represented as follow when the resonance frequency is f and the reciprocation length of the resonator is L, $$F=n\cdot(c/L) \text{ (n is a natural number)} \tag{4}$$

Therefore, in a case where the light of the fundamental frequency resonates, the light of a frequency of an integral multiple of the fundamental frequency will also resonate.

As described above, in a case where the frequency of the laser light to be incident on the optical resonator 2 is 2v, the frequency range in which an error signal can be acquired is as fairly wide as ±0.5 MHz. Therefore, even in a case where the difference between the frequency of twice the original oscillation frequency of v of the laser light in the laser light source unit 10 and the mode frequency is large to some extent, an error signal required for appropriate feedback control is generated, and the frequency locking operation is performed. That is, even if the oscillation frequency is not controlled with high accuracy, an error signal required for proper feedback control is generated and the frequency locking action is implemented.

The error signal generated by the error signal generation unit 191 reflects the difference between the frequency of 2v of the laser light and the mode frequency in real time. Therefore, the lock determination unit 192 repeatedly determines, based on the generated error signal, whether or not the deviation between the frequency of 2v and the mode frequency is within a predetermined frequency range (Step S3). Specifically, it is enough for the lock determination unit 192 to determine whether or not the deviation is within the frequency range in which an error signal can be acquired in the frequency of v, for example, the mode frequency of ±5 kHz. The lock determination unit 192 outputs a lock detection signal indicating that it is in a lock state when the frequency deviation falls within a predetermined frequency range (Yes in Step S3).

In response to the lock detection signal, the frequency conversion unit 12 switches the frequency of the laser light to be emitted, from the frequency of 2v to the frequency of v, i.e., the fundamental frequency (Step S4). The resonance mode of the optical resonator 2 appears on the frequency axis at positions from the frequency of 0 at equal frequency intervals. Therefore, if the frequency of 2v of the laser light and the mode frequency sufficiently coincide with each other in the frequency of 2v of the laser light, even if the frequency of the laser light changes, the frequency and the mode frequency sufficiently coincide with each other. Therefore, even after the frequency of the laser light has been switched in the frequency conversion unit 12, it is the same as before. In other words, the feedback control by the PHD method is continued, and the oscillation frequency of the laser light at the laser light source unit 10 is maintained in a manner as to well coincide with the mode frequency (Step S5). Of course, at this time, the lock determination unit 192 continuously outputs a lock detection signal indicating that the frequency deviation is within the predetermined frequency range.

In a state of maintaining the frequency of the laser light to be incident on the optical resonator 2 to the frequency of v, the measurement by the CRDS is performed (Step S6). That is, after accumulating the power of the laser light in the optical resonator 2, the laser light is blocked by the optical switch 15, and the intensity change of the light leaking through the exit-side mirror 22 is detected by the main photodetector 3. In this case, the longitudinal mode pulse line width is narrow and the reflectance of the mirror 21 and 22 is very high, so that it is possible to perform the highly sensitive measurement. Further, the state in which the oscillation frequency of the laser light coincides with the mode frequency by the PDH method is maintained. Therefore, the number of measurements by the CRDS per unit time can be increased, and therefore higher measurement efficiency can be achieved.

As described above, in the CRDS device of this embodiment, it is possible to perform highly sensitive CRDS measurement without controlling the oscillation frequency of the laser light by the laser light source unit 10 with high accuracy. Further, it is possible to quickly make the oscillation frequency of the laser light coincide with the mode frequency of the optical resonator 2. Therefore, the measurement can be started immediately, and the number of measurements per unit time can be increased to enhance the measurement efficiency.

Further, in a case where it is required to acquire a CRD signal over a wide frequency range, there are the following methods. That is, while sequentially making the oscillation frequency of the laser light coincide with each resonance mode appearing at constant frequency intervals, a CRD signal is acquired at each mode frequency. In the CRDS device of this embodiment, it is possible to rapidly make the oscillation frequency of the laser light coincides with each of frequencies of a plurality of modes, and therefore it is useful for acquiring a CRD signal over a wide frequency range by the above-described method.

Note that in the configuration shown in FIG. 1, the arrangement of the respective parts including the optical element is one example. For example, it is naturally possible to appropriately change the arrangement such that the optical switch 15 is arrange between the quarter-wave plate 17 and the optical resonator 2.

Second Embodiment

Next, a second embodiment of a gas absorption spectroscopic measurement device according to the present invention will be described with reference to the attached drawings.

Figure 4:
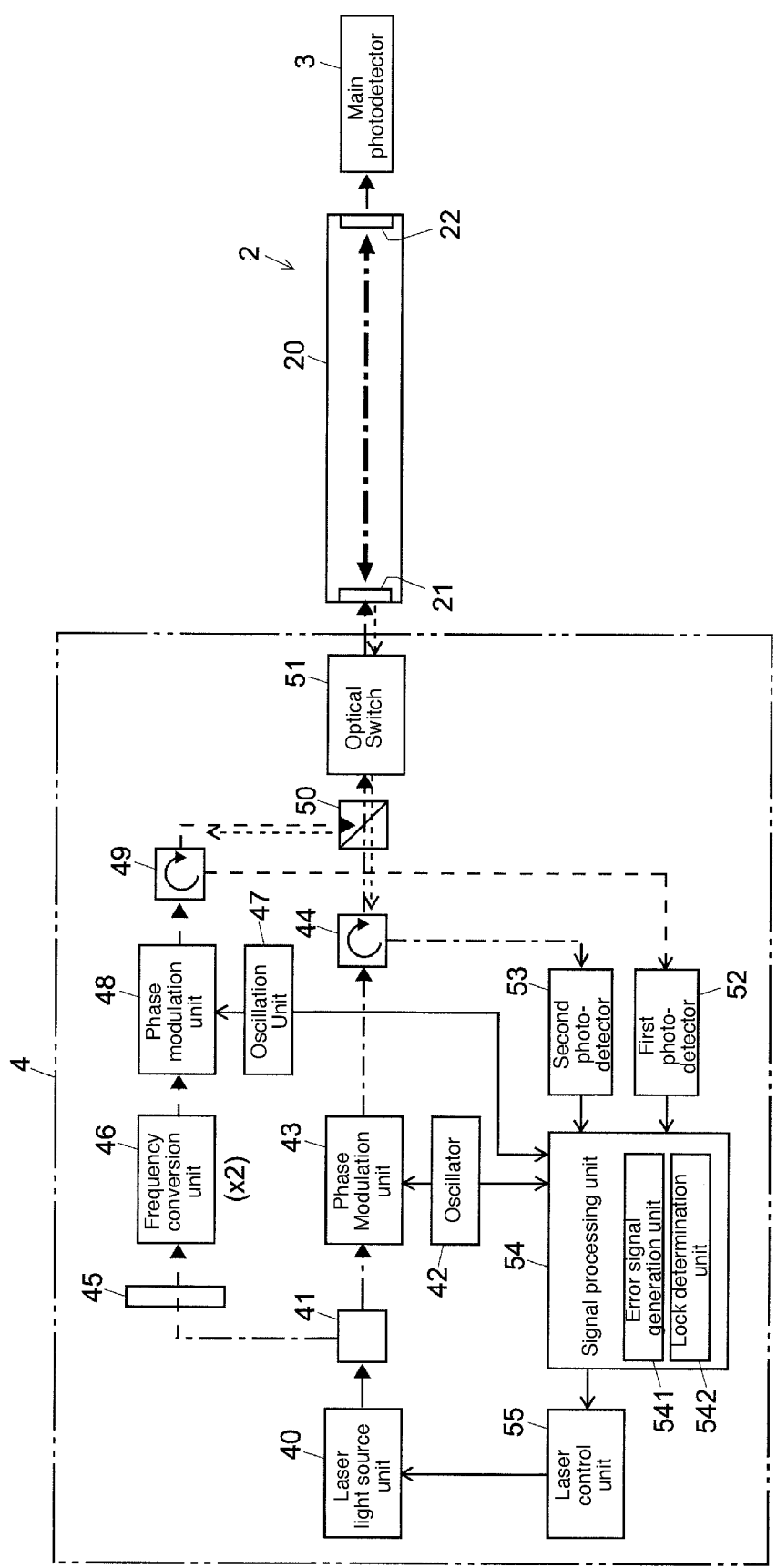
FIG. 4 is a configuration diagram of a main part of the CRDS device according to a second embodiment of the present invention.

FIG. 4 is a configuration diagram of a main part of a CRDS device according to the second embodiment. In this CRDS device, it is not configured such that the laser light of the frequency of v and the laser light of the frequency of 2v are selectively incident on the optical resonator 2 by being switched, but is configured such that two laser light different in frequency is simultaneously incident on the optical resonator 2.

As shown in FIG. 4, the laser irradiation unit 4 includes: a laser light source unit 40; an optical coupler 41; a second oscillation unit 42; a second phase modulation unit 43; a second optical circulator 44; a half-wave plate 45; a frequency conversion unit 46; a first oscillation unit 47; a first phase modulation unit 48; a first optical circulator 49; a polarization beam splitter 50; an optical switch 51; a first sub-photodetector 52; a second sub-photodetector 53; a signal processing unit 54; and a laser control unit 55. In the same manner as in the first embodiment device, the signal processing unit 54 includes, as functional blocks, an error signal generation unit 541 and a lock determination unit 542.

The optical coupler 41 is an optical element for splitting the incident light into a plurality (here two) of light and may be a splitter. Further, the first and second optical circulators 49 and 44 each are a non-reciprocating and unidirectional optical element having three ports. That is, the light incident on the first port is emitted only to the second port, the light incident on the second port is emitted only to the third port. Further, the half-wave plate 45 is an optical element for emitting the incident linearly polarized light by rotating by a predetermined angle.

In the CRDS device of this embodiment, the operation when CRDS (Cavity Ring-Down Spectroscopy) measurement is executed will be described.

The laser light of the frequency of v generated by the laser light source unit 40 is split into two systems by the optical coupler 41, one of which is introduced to the second phase modulation unit 43 and the other to the frequency conversion unit 46 through the half-wave plate 45. The frequency (and phase) of the laser light of the frequency of v is modulated in the second phase modulation unit 43 based on the modulation signal generated in the second oscillation unit 42 and is incident on the polarization beam splitter 50 through the second optical circulator 44. On the other hand, the half-wave plate 45 rotates the polarization azimuth of the linearly polarized light of the laser light by a predetermined angle to thereby convert, for example, s-polarized light into p-polarized light. The frequency conversion unit 46 converts the frequency of this laser light from the frequency of v to the frequency of 2v, which is doubled the frequency of v. The first phase modulation unit 48 modulates the frequency of the laser light of the frequency of 2v based on the modulation signal generated by the first oscillation unit 47. The modulated laser light is incident on the polarization beam splitter 50 through the first optical circulator 49.

The polarization beam splitter 50 selectively transmits the particular polarized component (e.g., s-polarized light) of the laser light of the frequency of v (modulated) incident through the second optical circulator 44 directed to the optical switch 51 toward the optical switch 51. The polarization beam splitter 50 selectively reflects the particular polarized component (e.g., p-polarized light) of the laser light of the frequency of 2v (modulated) incident through the first optical circulator 49 toward the optical switch 51. Therefore, when the optical switch 51 is in the open state, the laser light of the frequency of v which is s-polarized light and the laser light of the frequency of 2v which is p-polarized light are introduced together into the optical resonator 2.

The laser light that is s-polarized light of the frequency of v and the laser light that is p-polarized light of the frequency of 2v are reflected back and forth between the pair of mirrors 21 and 22. A portion of the light passes through the incident-side mirror 21 and returns to the polarization beam splitter 50. The polarized state of the returning light is the same as the polarized state of the original irradiation light. Therefore, the returning light that is s-polarized light of the frequency of v passes through the polarization beam splitter 50 and returns to the second optical circulator 44, and the traveling direction is changed by the second optical circulator 44 to be incident on the second sub-photodetector 53. On the other hand, the returning light that is p-polarized light of the frequency of 2v is reflected by the polarization beam splitter 50 to return to the first optical circulator 49, and the traveling direction is changed in the first optical circulator 49 to be incident on the first sub-photodetector 52.

As described above, the light of the wavelength of v and the light of the wavelength of 2v resonate in the optical resonator 2. Thus, the detection signal by the first sub-photodetector 52 and the detection signal by the second sub-photodetector 53 both contain the information about the resonance mode of the optical resonator 2. In the signal processing unit 54, the error signal generation unit 541 generates a second error signal containing the information on the difference between the mode frequency of the optical resonator 2 and the frequency of v of the laser light, from the detection signal by the second sub-photodetector 53 and the modulation signal by the second oscillation unit 42. Further, the error signal generation unit 541 generates a first error signal containing the information on the difference between the mode frequency of the optical resonator 2 and the frequency of 2v of the laser light, from the detection signal by the first sub-photodetector 52 and the modulation signal by the first oscillation unit 47.

In the initial state in which the fundamental frequency of the laser light does not coincide with the mode frequency of the optical resonator 2, the lock determination unit 542 outputs a signal indicating that it is in a non-lock state. In this instance, the error signal generation unit 541 selects an error signal based on the returning light of the frequency of 2v and sends it to the laser control unit 55. The laser control unit 55 controls the oscillation frequency of the laser light in the laser light source unit 40 so that this error signal is reduced. In other words, the oscillation frequency of the laser light and the mode frequency are made to coincide with each other by executing the feedback control by the PDH method using the laser light of the frequency of 2v.

The lock determination unit 542 determines whether or not the deviation between the oscillation frequency of the laser light and the mode frequency is within a predetermined frequency range from the above-described two error signals. When the frequency deviation falls within the predetermined frequency range, the lock determination unit 542 outputs a lock detection signal. Upon receiving this signal, the error signal generation unit 541 selects the error signal based on the returning light of the frequency of v rather than the error signal based on the returning light of the frequency of 2v and switches the operation to send the error signal to the laser control unit 55. After this switching, the feedback control by the PHD method using the laser light of the frequency of v is performed, so that the oscillation frequency of the laser light at the laser light source unit 10 is maintained in a state in which it sufficiently coincides with the mode frequency.

As described above, the CRDS measurement is performed in a state in which the oscillation frequency of the laser light at the laser light source unit 10 sufficiently coincides with the mode frequency. Note that the CRDS measurement can also be performed by using laser light of the frequency of 2v. In the case of the frequency of 2v, however, the reflectance of the mirror 21, 22 is lower as compared with the case in which the frequency is v. For this reason, the ring-down time is short, and therefore, the measurement accuracy and sensitivity deteriorate by that amount. There is substantially no benefit of performing CRDS measurement using the laser light of the frequency of 2v. Therefore, the CRDS measurement is sufficiently performed using laser light of the frequency of v.

[Modification of Second Embodiment]

In the CRDS device of the second embodiment, in the same manner as in the CRDS device of the first embodiment, the frequency of the light used for a feedback control by the PDH method is switched from the original frequency of 2v to the frequency of v. This is because, generally, after the oscillation frequency of the laser light and the mode frequency coincide with each other once, it is possible to maintain the higher accuracy by suppressing the fluctuation of the oscillation frequency of the laser light by implementing the feedback control by the PHD method using the light of the frequency of v. However, even in a state where the feedback control is being performed by the PHD method using the light of the frequency of 2v, the fluctuation of the oscillation frequency of the laser light is seldom problematic in terms of the measurement accuracy.

Therefore, in the CRDS device of the second embodiment, the configuration may be changed as follows. That is, the feedback control of the oscillation frequency of the laser light by the PDH method is performed using the light of the frequency of 2v. And, the error signal acquired for the light of the frequency of v is used only to determine that it becomes a state in which it is ready to be measured by the CRDS device. Specifically, the error signal generation unit 541 always causes the error signal to be sent to the laser control unit 55 to be an error signal using the light of the frequency of 2v. The lock determination unit 542 outputs a lock detection signal when the error signal acquired for the light of the frequency of v falls within a predetermined range. And, the control unit (not shown) performs the CRDS measurement after obtaining the lock detection signal. Even in such a configuration, almost in the same manner as in the CRDS device of the first and second embodiments, without controlling the oscillation frequency of the laser light with high accuracy, it is possible to perform the high-precision and high-sensitivity measurement.

Note that, in the above-described embodiment, the oscillation frequency (fundamental frequency) of the laser light was doubled, but it may be multiplied by a natural number other than two. It is obvious from the above description that even if the frequency of the laser light is changed as described above, resonance occurs at the optical resonator 2. In practice, however, there is substantially no need to multiply the fundamental frequency by a natural number of 3 or more because the frequency range capable of acquiring an appropriate error signal will be greatly expanded by simply doubling the fundamental frequency.

Further, the frequency of the light that resonates at the optical resonator 2 depends on the round trip length of the resonator. Therefore, in the device of the first embodiment, when the oscillation frequency of the laser light is multiplied by n, even if the n is slightly deviated from the natural number, it is possible to cause the resonance by finely adjusting the round trip length of the resonator 2. Therefore, it is not necessary to configure such that the oscillation frequency of the laser light is strictly multiplied by a natural number.

Further, it should be noted that the above-described embodiments are examples of each aspect of the present invention, and it is apparent that even if modifications, alternations, additions, and the like are appropriately made within the spirit of the present invention, they are encompassed by claims.

Various Embodiments

Although some embodiments of the present invention have been described above with reference to the accompanying drawings, it is readily understood by those skilled in the art that the above-described plurality of embodiments and modifications thereof are specific examples of the following aspects.

(Item 1)

A gas absorption spectroscopic measurement device according to one aspect of the present invention is configured to acquire a component concentration of a gas to be measured by cavity ring-down absorption spectroscopy, the gas absorption spectroscopic measurement device comprising:

a laser irradiation unit;
an optical resonator configured to cause light emitted from the laser irradiation unit to resonate, the optical resonator including a measurement cell for accommodating the gas to be measured; and
a first detection unit configured to detect light taken out of the optical resonator, wherein the laser irradiation unit includes:

a laser light source capable of adjusting an oscillation frequency;
a frequency conversion unit configured to selectively output either laser light having the same frequency as the laser light source or laser light having a frequency of the frequency of the laser light source multiplied by a predetermined number of times;
a frequency modulation unit configured to modulate the frequency of the laser light emitted from the frequency conversion unit using a modulation signal;
a second detection unit configured to detect returning light from the optical resonator derived from the laser light emitted to the optical resonator after being modulated by the frequency modulation unit; and
a feedback control unit configured to generate an error signal affected by a difference between a frequency of the laser light emitted to the optical resonator and a mode frequency of the optical resonator, based on a detection signal from the second detection unit and the modulation signal, thereby controlling the oscillation frequency of the laser light source in response to the error signal.

In the gas absorption spectroscopic measurement device as recited in the above-described Item 1, for example, in a state in which immediately after the start of the device, the oscillation frequency of the laser light in the laser light source and the mode frequency of the optical resonator do not coincide with each other, the oscillation frequency of the laser light source is adjusted to coincide with the mode frequency. In other words, the oscillation frequency of the laser light source is adjusted to coincide with the mode frequency by the feedback control by the PDH method using the laser light of not the fundamental frequency but a frequency acquired by multiplying the fundamental frequency by predetermined times.

Since the longitudinal mode pulse width of the optical resonator at the frequency of a predetermined number of times is wider than that at the fundamental frequency, the frequency range capable of acquiring an appropriate error signal to perform the feedback control by the PDH method becomes wider. Thus, even if the difference between the frequency of the laser light and the mode frequency is large to some extent, good feedback control is performed so that the frequency of the laser light coincides with the mode frequency, and the oscillation frequency of the laser light is adjusted. Then, when the oscillation frequency of the laser light sufficiently coincides with the mode frequency, it shifts to the feedback control by the PDH method using the laser light of a fundamental frequency. Then, for example, the measurement is performed in a state in which the oscillation frequency of the laser light sufficiently coincides with the mode frequency.

As described above, according to the gas absorption spectroscopic measurement device as recited in the above-described Item 1, there is no need to control the oscillation frequency of the laser light in the laser light source with high accuracy. High accuracy and sensitivity CRDS (Cavity Ring-Down Spectroscopy) measurement is performed in a state in which the oscillation frequency of the laser light and the mode frequency of the optical resonator coincide with each other quickly and the state is maintained. Since the oscillation frequency of the laser light does not need to be controlled with high precision, the equipment is less costly. Also, the oscillation frequency of the laser light and the mode frequency of the optical resonator can be quickly matched to maintain that state. Therefore, it is possible to increase the number of measurements that can be performed per unit time and improve measurement efficiency.

(Item 2)

A gas absorption spectroscopic measurement device according to another aspect of the present invention is configured to acquire a component concentration of a gas to be measured by cavity ring-down absorption spectroscopy, the gas absorption spectroscopic measurement device comprising:

a laser irradiation unit;

an optical resonator configured to cause light emitted from the laser irradiation unit to resonate, the optical resonator including a measurement cell for accommodating the gas to be measured; and a first detection unit configured to detect light taken out of the optical resonator, wherein the laser irradiation unit includes:

a laser light source capable of adjusting an oscillation frequency thereof;

a splitting unit configured to split the laser light emitted from the laser light source into a plurality of laser light;

a frequency conversion unit configured to output one of the plurality of laser light split by the splitting unit having a frequency of the frequency of the laser light source multiplied by a predetermined number of times;

a first frequency modulation unit configured to modulate a frequency of the laser light emitted from the frequency conversion unit, using a first modulation signal;

a second frequency modulation unit configured to modulate a frequency of the other laser light split at the splitting unit, using a second modulation signal;

a unification unit configured to cause first laser light modulated by the first frequency modulation unit and second laser light modulated by the second frequency modulation unit to be incident on the optical resonator in an optically separable manner; and a second detection unit configured to independently detect returning light from the light resonator derived from the first laser light emitted to the optical resonator and returning light from the light resonator derived from the second laser light emitted to the light resonator; and a feedback control unit, wherein the feedback control unit is configured to:

generate a first error signal reflecting a difference between a frequency of the first laser light and a mode frequency of the optical resonator, based on a detection signal by the second detection unit and the first modulation signal;

perform feedback control of an oscillation frequency in the laser light source in response to the first error signal to thereby adjust the oscillation frequency to the mode frequency of the oscillation resonator; and thereafter maintain a state of the feedback control, or generate a second error signal reflecting a difference between a frequency of the second laser light and the mode frequency of the optical resonator, based on a detection signal by the second detection unit derived from returning light derived from the second laser light and the second modulation signal, and perform feedback control corresponding to the second laser light to continuously perform the control of the oscillation frequency in the laser light source.

In the gas absorption spectroscopic measurement device as recited in the above-described Item 1, the oscillation frequency of the laser light in the laser light source is switched in the loop for the feedback control is switched. In contrast, in the gas absorption spectroscopic measurement device recited in the above-described Item 2, the error signal used for controlling the oscillation frequency of the laser light at the laser light source in the loop for the feedback control of the oscillation frequency of the laser light in the laser light source is switched. In other words, an electric signal is switched rather than the optical switching. Therefore, even in the gas absorption spectroscopic measurement device as recited in the above-described Item 2, the oscillation frequency of the laser light source is adjusted to coincide with the mode frequency. In other words, in a state in which the oscillation frequency of the laser light in the laser light source does not coincide with the mode frequency of the optical resonator, feedback control by the PDH method using the laser light of the frequency acquired by multiplying the fundamental frequency by a predetermined number of times is performed. With this, the oscillation frequency of the laser light source is adjusted to coincide with the mode frequency. Then, when it becomes a state in which the oscillation frequency of the laser light sufficiently coincides with the mode frequency, it shifts to the feedback control by the PDH method using the laser light of the fundamental frequency. And, for example, the measurement is performed with the oscillation frequency of the laser light sufficiently matched to the mode frequency.

According to the gas absorption spectroscopic measurement device as recited in the above-described Item 2, highly accurate and sensitivity CRDS (Cavity Ring-Down Spectroscopy) measurement can be performed in the same manner as in the device described in the above-described Item 1. That is, without controlling the oscillation frequency of the laser light in the laser light source with high accuracy, it is possible to quickly cause the oscillation frequency of the laser light to coincide with the mode frequency of the optical resonator. In a state in which it is maintained, highly accurate and sensitivity CRDS (Cavity Ring-Down Spectroscopy) measurement can be performed. Since the oscillation frequency of the laser light does not need to be controlled with high precision, the equipment is less costly. In addition, since the oscillation frequency of the laser light and the mode frequency of the optical resonator can be quickly matched to maintain the state, the number of measurements capable of performing per unit of time can be increased and the measurement efficiency can be improved.

(Item 3)

A frequency locking method according to one aspect of the present invention is a frequency locking method for locking an oscillation frequency of a laser light source to a resonance frequency of an optical resonator, the frequency locking method comprising:

a first step of converting a frequency of laser light to an integral multiple of the oscillation frequency;

a second step of modulating the laser light in which a frequency has been converted, using a modulation signal;

a third step of causing the modulated laser light to be incident on the optical resonator;

a fourth step of detecting returning light from the optical resonator;

a fifth step of generating an error signal corresponding to a difference between a frequency of the laser light incident on the optical resonator and a mode frequency of the optical resonator, based on detected returning light and the modulation signal; and a sixth step of controlling the oscillation frequency of the laser light source by performing feedback of the error signal.

According to the frequency locking method as recited in the above-described Item 3, without controlling the oscillation frequency of the laser light in the laser light source with high accuracy, it is possible to quickly cause the oscillation frequency of the laser light to coincide with the mode frequency of optical resonator and lock the frequency.

(Item 4)

Further, a gas absorption spectroscopic measurement method according to one aspect of the present invention uses the frequency locking method as recited in the above-described Item 3, and the method further comprises:

a seventh step of adjusting the oscillation frequency of the laser light source to the mode frequency of the optical resonator, and thereafter, while maintaining feedback control in the step, performing measurement by cavity ring-down absorption spectroscopy using laser light from the laser light source.

(Item 5)

A gas absorption spectroscopic measurement method according to another aspect of the present invention uses the frequency locking method as recited in claim 3, and the method further comprises:

method as recited in claim 3, further comprising:

a seventh step of adjusting the oscillation frequency of the laser light source to the mode frequency of the optical resonator, and thereafter modulating a frequency of the laser light of a fundamental frequency emitted from the laser light source using a modulation signal and emitting it to the optical resonator, and, while performing feedback control based on the returning light, performing measurement by cavity ring-down absorption spectroscopy using laser light of a fundamental frequency from the laser light source.

According to the gas absorption spectroscopic measurement method as recited in the above-described Items 4 or 5, the measurement is performed in a state in which the oscillation frequency of the laser light sufficiently coincides with the mode frequency. Therefore, highly accurate and sensitivity CRDS (Cavity Ring-Down Spectroscopy) measurement can be performed.

DESCRIPTION OF SYMBOLS 1, 4: Laser irradiation unit
10, 40: Laser light source unit
11, 55: Laser control unit
12, 46: Frequency conversion unit
13, 42, 47: Oscillation unit
14, 43, 48: Phase modulation unit
15, 51: Optical switch
16, 50: Polarization beam splitter
17: Quarter-wave plate
18, 52, 53: Sub-photodetector
19, 54: Signal processing unit
191, 541: Error signal generation unit
192, 542: Lock determination unit
2: Optical resonator
20: Measurement cell
21, 22: Mirror
3: Main photodetector
41: Optical coupler
44, 49: Optical circulator
45: Half-wave plate

The invention claimed is:

1. A gas absorption spectroscopic measurement device configured to acquire a component concentration of a gas to be measured by cavity ring-down absorption spectroscopy, the gas absorption spectroscopic measurement device comprising:

a laser irradiation unit;
an optical resonator configured to cause light emitted from the laser irradiation unit to resonate, the optical resonator including a measurement cell for accommodating the gas to be measured; and
a first detector configured to detect light taken out of the optical resonator,
wherein the laser irradiation unit includes:
a frequency adjustable laser light source;
a frequency converter configured to selectively output either laser light having the same frequency as the laser light source or laser light having a frequency of the frequency of the laser light source multiplied by a predetermined number of times;
a frequency modulator configured to modulate the frequency of the laser light emitted from the frequency converter using a modulation signal;
a second detector configured to detect returning light from the optical resonator derived from the laser light emitted to the optical resonator after being modulated by the frequency modulator; and
a feedback controller configured to generate an error signal affected by a difference between a frequency of the laser light emitted to the optical resonator and a mode frequency of the optical resonator, based on a detection signal from the second detector and the modulation signal, thereby controlling an oscillation frequency of the laser light source in response to the error signal.

2. A gas absorption spectroscopic measurement device configured to acquire a component concentration of a gas to be measured by cavity ring-down absorption spectroscopy, the gas absorption spectroscopic measurement device comprising:

a laser irradiation unit;
an optical resonator configured to cause light emitted from the laser irradiation unit to resonate, the optical resonator including a measurement cell for accommodating the gas to be measured; and
a first detector configured to detect light taken out of the optical resonator,
wherein the laser irradiation unit includes:
a frequency adjustable laser light source;
a splitting unit splitter configured to split the laser light emitted from the laser light source into a plurality of laser light;
a frequency converter configured to output one of the plurality of laser light split by the splitter having a frequency of the frequency of the laser light source multiplied by a predetermined number of times;
a first frequency modulator configured to modulate a frequency of the laser light emitted from the frequency converter, using a first modulation signal;
a second frequency modulator configured to modulate a frequency of the other laser light split at the splitter, using a second modulation signal;
a combiner configured to cause first laser light modulated by the first frequency modulator and second laser light modulated by the second frequency modulator to be incident on the optical resonator in an optically separable manner; and
a second detector configured to independently detect returning light from the light resonator derived from the first laser light emitted to the optical resonator and returning light from the light resonator derived from the second laser light emitted to the light resonator; and
a feedback controller,
wherein the feedback controller is configured to:
generate a first error signal reflecting a difference between a frequency of the first laser light and a mode frequency of the optical resonator, based on a detection signal by the second detector and the first modulation signal;
perform feedback control of an oscillation frequency of the laser light source in response to the first error signal to thereby adjust the oscillation frequency to the mode frequency of the oscillation resonator; and thereafter
maintain a state of the feedback control, or
generate a second error signal reflecting a difference between a frequency of the second laser light and the mode frequency of the optical resonator, based on a detection signal by the second detector derived from returning light derived from the second laser light and the second modulation signal, and perform feedback control corresponding to the second laser light to continuously perform the control of the oscillation frequency of the laser light source.

\* \* \* \* \*